Nov. 1, 1966  L. A. DE PAS  3,282,574

HUMIDIFIER

Filed Aug. 10, 1964

INVENTOR
LADDIE A. DePAS

BY Francis L. Snyder
AGENT

United States Patent Office 3,282,574
Patented Nov. 1, 1966

3,282,574
HUMIDIFIER
Laddie A. De Pas, Sodus, Mich., assignor to
Whirlpool Corporation
Filed Aug. 10, 1964, Ser. No. 388,536
1 Claim. (Cl. 261—29)

This invention relates to a humidifier and specifically to a humidifier which disperses liquid vapor to a space to be humidified.

Several different types of liquid vapor humidifiers are presently being marketed. One such type is a humidifier which disperses drops of liquid into the room being humidified. This type of humidifier has the disadvantage in that it deposits the impurities entrained in the liquid droplets together with some dust in the room's air on the furniture, electronic equipment, etc. in the room.

A second type of humidifier employs a costly filtering system to separate these impurities from the liquid and some of the dust from the air before the humidified air is dispersed to the room. However, when the filter of this type of humidifier becomes saturated with the impurities and dust, the capacity and efficiency of the humidifier drops sharply.

A third type of humidifier uses liquid adsorbent baffles, which are usually placed in the air duct of a furnace system, with at least a portion of each baffle communicating with a liquid reservoir. Air is passed over these baffles to evaporate the liquid therefrom and humidify the passing air stream. However, when the aforementioned baffles become saturated with impurities from the liquid, their absorption capacity is substantially reduced and the evaporation by the air and the resulting humidification drops sharply.

The instant invention employs an apparatus for imparting substantially impurity-free humidified air to a room by slinging liquid containing impurities in the form of droplets across an air passage with a spinning disc arrangement, and flowing air from the room into contact with the droplets for partially evaporating the droplets until the droplets with the impurities therein strike the other side of the air passage, collecting the remaining portion of the droplets and the impurities in an annular tray and returning the unevaporated portion of the droplets to the liquid source while the impurity-free humidified air flows out into the room. Likewise, when the droplet is traveling through the space in contact with the room's air, the droplet will pick up some of the dust and other impurities in the room's air and carry such dust and impurities to the point of collection. Therefore, it is an object of this invention to provide a humidified air stream which is free of liquid solids and impurities and substantally free of dust.

It is a further object to provide a humidifying apparatus which will provide an impurity-free and substantially dust-free humidified air stream without the aid of mechanical filters.

A feature of the invention resides in the collection means for collecting and returning the impurities from the humidifying liquid and the air, to the reservoir of the humidifying apparatus.

Another feature of the invention resides in the swirling or centrifugal effect which is imparted to the air during and after humidification to prevent entrainment of liquid solids in the humidified air stream which is exhausted into the room to be humidified.

Still another feature of the invention resides in the apparatus for only partially evaporating the liquid containing the impurities while retaining the impurities within the partially evaporated liquid and returning the partially evaporated liquid containing the impurities to the liquid reservoir of the humidifying apparatus.

A still further feature of the invention resides in the apparatus for humidifying the air to be humidified without entraining impurities of the humidifying liquid into the humidified air and for filtering substantial quantities of dust from the air.

Other features and advantages of the invention will be obtained from the following description taken in connection with the accompanying drawings herein in which.

Figure 4:
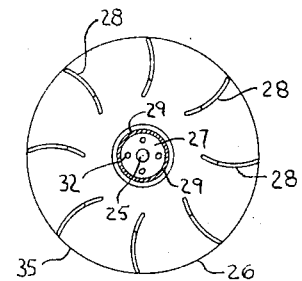
FIGURE 4 is a bottom vew of the air translation means.

In the exemplary embodiment of the invention as disclosed in the drawings, the humidifying apparatus generally designated as 10 is shown to comprise a liquid reservoir 11 for containing a liquid, such as tap water, having natural impurities therein and a removable cover 13, all of which may be made of plastic or metal to define an enclosed chamber 12. The natural impurities of the liquid may be minerals such as calcium, iron, magnesium, sodium and potassium. Particles of dust may also make up a portion of the impurities of the liquid.

Figure 5:
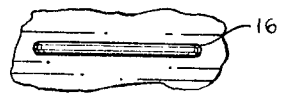
FIGURE 5 is a fragmentary view of the anti-swirl vane as taken substantially along line 5—5 of FIGURE 2.

Liquid reservoir 11 is supported by casters 14 on a surface such as floor 15 or a table top (not shown). An anti-swirl vane 16, as shown in FIGURE 5, is located on the inner bottom surface 17 of liquid reservoir 11. Vane 16 is positioned at the centerline of the bottom surface 17 to reduce the tendency of the liquid from swirling in liquid reservoir 11. Swirling of the liquid in reservoir 11 is objectionable because such swirling causes noisy operation of the humidifier and also hinders the pumping operation.

Figure 1:
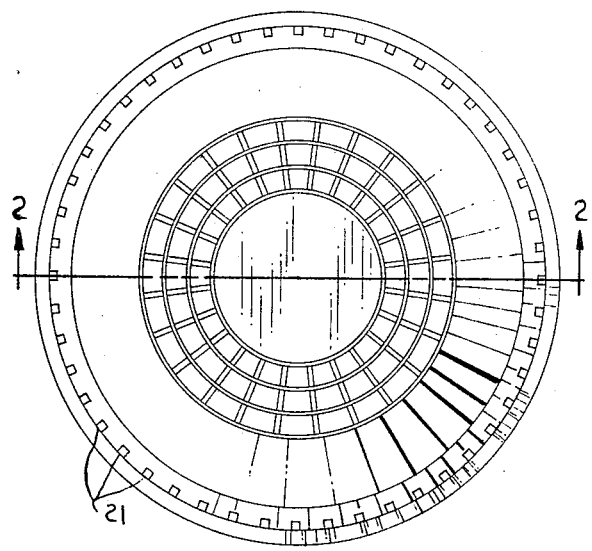
FIGURE 1 is a plan view of the humidifying apparatus embodying the invention.

Cover 13 has an angular portion 18 which cooperates with upper rim 19 of reservoir 11. The top portion 20 of cover 13 connects to and is integral with the angular portion 18. Angular portion 18 has air inlet openings 21 therein spaced apart around the entire circumference thereof, to provide for intake of air from the room to be humidified (see FIGURE 1). Air outlet openings 22 are located in top portion 20 of cover 13 and completely surround motor 23. This allows the flow of a humidified air stream around motor 23 to cool motor 23 as well as to humidify the surrounding room, as will be described hereinafter.

Figure 2:
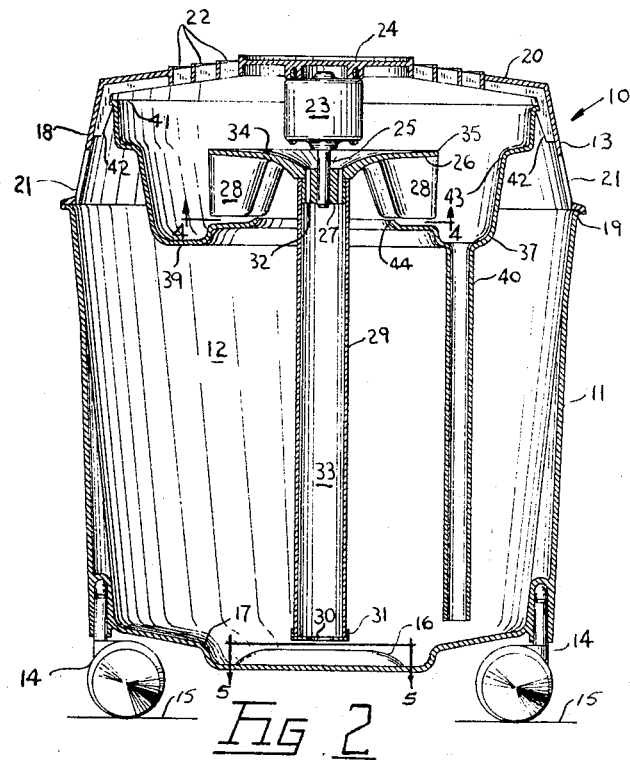
FIGURE 2 is a sectional view taken substantially along line 2—2 of FIGURE 1.

Motor 23 is attached to the top portion 20 of cover 13 by a plurality of screws 24. Motor 23 includes a shaft 25 capable of being rotated upon energization of motor 23. Disc 26 has an integral hub portion 27 which is connected to shaft 25 for rotation of disc 26 upon energization of motor 23. A plurality of curved blower blades 28 are located beneath disc 26 and are integral therewith for causing movement of air through the humidifying apparatus 10. An elongate hollow tube 29 having a passage 33 therein may be formed integral with hub 27 or spot welded thereto, as shown in FIGURE 2, and extends downwardly from hub 27 into liquid reservoir 11 and below the liquid level. A liquid inlet opening 30 is located in the bottom portion 31 of tube 29. A plurality of liquid outlet passages 32 are located in hub 27 and communicate with passage 33 of tube 29.

During rotation of shaft 25, disc 26 and tube 29, liquid is pumped by centrifugal force, in the well-known manner, upwardly through passage 33 of tube 29 and through passages 32 where it is centrifugally distributed evenly across the upper surface 34 of disc 26. The spinning of disc 26 causes the liquid to be thrown or slung outwardly from the entire outer periphery 35 of disc 26 in the form of droplets 36. The droplets 36 travel from disc 26 across an annular air passage to a collector arrangement 37 where the droplets are returned to reservoir 11. The annular air passage is defined by outer periphery 35 of disc 26 and shoulder 43 of collector arrangement 37.

Figure 3:
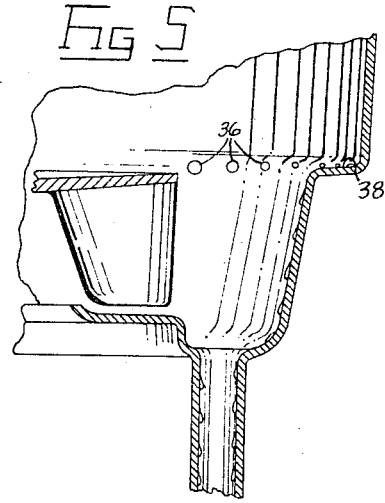
FIGURE 3 is an enlarged broken away portion showing the liquid droplets traversing the air passage of FIGURE 2.

A collector arrangement 37 comprises an annular impact portion 38 which is slightly inclined, an annular collector tray portion 39 and a liquid return tube 40 (see FIGURE 3). Collector arrangement 37 has at its top an outwardly turned flange 41 which cooperates with clip means 42 for attaching collector arrangement 37 to cover 13 intermediate the air inlet openings 21 and air outlet openings 22 (see FIGURE 1). The cooperation of the collector arrangement 37 with the cover 13 and reservoir 11 defines an air passage in chamber 12 from air inlet openings 21 to air outlet openings 22. The clip means 42 may be integral with cover 13 or spot welded thereto. Droplets, such as 36, which are slung from disc 26 are thrown against the inclined impact portion 38 of collector arrangement 37 and are collected in collector tray portion 39 to be returned to reservoir 11 through return tube 40.

The inclined impact portion 38 serves to keep the droplet striking noise at a minimum by providing a slide for the droplet rather than a sudden stop. Therefore, the impact of each droplet is dampened by the incline and liquid returning from the inclined impact portion 38 to collector tray 39. Collector arrangement 37 has an aperture 44 located centrally thereof to allow hollow tube 29 to extend into reservoir 11 and to define an air passage between inlet openings 21 and outlet openings 22.

Operation

When motor 23 is energized, liquid from reservoir 11 is pumped into opening 30 and upwardly through passage 33 of tube 29 by centrifugal action imparted to the liquid by the rotation of tube 29. The liquid then flows from passage 33 through passages 32 in hub 27 for distribution on the upper surface 34 of disc 26. The liquid is then slung from the full outer periphery 35 of disc 26 in the form of droplets which are directed across an annular passage, defined by shoulder 43 of impact portion 38 and the outer periphery 35 of disc 26, to the impact portion 38. From impact portion 38, the liquid drains to collector tray 39 to be returned to reservoir 11. Simultaneously, the rotation of blower blades 28 draws air through inlet openings 21, around collector arrangement 37, through opening 44 in collector arrangement 37, to blower blades 28 and thence through the annular passage between outer periphery 35 and impact portion 38 where it comes in contact with the droplets to become humidified and then is exhausted through outlet openings 22. As the air passes through the annular passage, it partially evaporates the liquid droplets 36 into the air stream, humidifying the air. However, since the impurities are heavier, they stay with the unevaporated portion of the droplet until it strikes impact portion 38, and then is returned to reservoir 11 with the unevaporated portion of the droplet. The droplets are so numerous that they almost provide a water curtain across the aforedescribed annular passage. This partial water curtain serves not only to humidify the air, but also to wash dust particles from the air flow and provide substantially dust-free humidified air to the room. Blower blade 28 imparts to the air leaving it a swirling or centrifugal action to separate any liquid droplets from the air stream which might have entered the air because of splash or small droplet size.

Since the vapor pressure of the impurities in the liquid is substantially non-existent, at a room temperature of approximately 70°F compared to that of the liquid, the impurities will not separate from the droplets during partial evaporation thereof. Therefore, only impurity-free liquid vapor is exhausted to the room to be humidified.

It is obvious that the size of the droplet is very important to the satisfactory operation of this invention. The droplet size emanating from disc 26 is controlled by the angular velocity and diameter of the disc. The droplet size is mathematically expressed by the formula $$d = 3.8/W \times (T/D\rho)^{1/2}$$

where:

$d$ = droplet diameter
$\rho$ = liquid density
$T$ = liquid surface tension
$D$ = disc diameter
$W$ = disc annular velocity The droplets emanating from disc 26 have a gravitational force acting downwardly on them as they traverse the annular passage. This force is expressed by the formula $$Fg = g_L M_d [(\rho_d - \rho)/\rho_d]$$

where:

$Fg$ = gravitational force on droplet
$g_L$ = local acceleration due to gravity
$M_d$ = mass of droplet
$\rho_d$ = true density of droplet
$\rho$ = density of liquid The gravitational force, $Fg$, decreases as the droplet travels across the annular passage since the mass—$\pi D^3/6\rho_d$ where D is the droplet diameter and $\rho_d$ is the droplet density—of the droplet decreases due to partial evaporation of the droplet. In fact, the force $Fg$ decreases proportionally to the cube of the diameter of the droplet as can be noted from the equation $\pi D^3/6\rho_d$.

Simultaneously, as the droplets traverse the annular passage, they are subjected to an upwardly directed stream of air from blower blades 28 which cause an upward drag force $F_D$, that acts against the gravitational force $Fg$. The drag force is expressed by the formula $$F_D = \frac{C_D \rho U_0^2 A_d}{2g}$$

where:

$F_D$ = drag force on droplets
$C_D$ = drag coefficient in turbulent air flow
$\rho$ = density of the air
$U_0^2$ = velocity of the air approaching the droplets
$A_d$=area of droplets normal to flow of air
$g$=acceleration of gravity The drag force, $F_D$, on the droplets also decreases as the droplet traverses the annular passage, since the area—$\pi D^2/4$ where D is the droplet diameter—$A_d$, of the droplet normal to the air flow decreases due to partial evaporation thereof. In fact, the drag force $F_D$ decreases proportionally to the square of the diameter of the droplet as can be noted from the equation $\pi D^2/4$. Therefore, the force, $Fg$, decreases more rapidly than does the force, $F_D$, since the former decreases proportionally to the cube of the diameter whereas the latter decreases proportionally to the square of the diameter.

Since the gravitational force, $Fg$, must always be greater than the drag force, $F_D$, to prevent entrainment of the droplets in the upwardly flowing air stream, the droplets must be of sufficient diameter from the time they leave the disc 26 until they contact the impact portion 38.

Having described my invention as related to the embodiment shown in the accompanying drawings, it is my intention that the invention be not limited by any of the details of description unless otherwise specified, but rather be construed broadly in the spirit and scope as set out in the accompanying claim.

A humidifying apparatus for imparting substantially impurity-free liquid vapor to air in a space to be humidified, comprising: vertically extending reservoir means for containing liquid having impurities therein, said reservoir means having an upper open end terminating in an upwardly directed annular rim; cover means having an angular upwardly extending annular portion removably supported at its lower end on said annular rim and a top portion integral with and closing the upper end of said angular portion, said cover means cooperating with said reservoir means to define an enclosed chamber, said cover means having a plurality of air inlet openings in the lower end of its angular portion and air outlet openings in its top portion; annular collector means having a central aperture therethrough and means surrounding said aperture defining an annular collector tray portion, an annular slightly inclined shoulder portion connected to the upper end of said tray portion and extending radially outwardly therefrom, and a liquid return portion communicating said tray portion with said reservoir, said collector means being supported by said cover means for removal therewith and positioned intermediate said air inlet and said air outlet openings for defining an air flow path; rotatable liquid translation means comprising a disc-shaped member positioned in said air flow path radially inwardly of and on the same level with said annular slightly inclined shoulder portion and a tubular member extending from said disc-shaped member through said aperture in communication with said liquid in said reservoir means for uninterrupted distribution of said liquid in the form of droplets from said disc-shaped member to said annular slightly inclined shoulder portion upon rotation of said liquid translation means; drive means attached to and depending from said top portion of said cover means centrally thereof and operatively connected to said liquid translation means for rotation thereof; and curved blade means operatively connected to the bottom of said disc-shaped member for flowing air from said space to be humidified through said air inlet openings to said air flow path for humidification thereof, and humidified air from said air flow path through said air outlet openings to said space upon operation of said drive means, said blade means affecting the centrifugal separation of droplets from the humidified air by imparting a centrifugal motion to said air during and after humidification thereof, whereby said air flowing through said air flow path partially evaporates said droplets and the unevaporated, impurity-laden portion of said droplets impinges upon said annular slightly inclined shoulder portion and is collected by said collector means and returned to said reservoir for substantially impurity-free and droplet-free humidification of the air.

References Cited by the Examiner

UNITED STATES PATENTS

| | | | |
|---|---|---|---|
| 1,955,518 | 4/1934 | Sherwood | 261—91 |
| 2,022,415 | 11/1935 | Feldermann | 261—91 |
| 2,028,444 | 1/1936 | Feldermann | 261—91 |
| 2,078,204 | 4/1937 | Manning et al. | 261—91 |
| 2,766,027 | 10/1956 | Herr | 261—91 |
| 3,055,645 | 9/1962 | Feldermann | 261—91 X |

ROBERT F. BURNETT, *Primary Examiner.*

D. K. DENENBERG, *Assistant Examiner.*